United States Patent [19]

Zuber

[11] 4,322,198

[45] Mar. 30, 1982

[54] COIL HANDLING DEVICE

[75] Inventor: Bretislav P. Zuber, Montreal, Canada

[73] Assignee: Northern Telecom Limited, Montreal, Canada

[21] Appl. No.: 140,727

[22] Filed: Apr. 16, 1980

[51] Int. Cl.³ .............................................. B64H 19/02

[52] U.S. Cl. ............................... 414/754; 242/86.5 R; 414/911; 414/684; 414/772; 414/776

[58] Field of Search ............... 414/680, 684, 754, 772, 414/776, 783, 908, 911, 607; 242/86.5 R, 86.5 A; 29/568

[56] References Cited

U.S. PATENT DOCUMENTS

| | | | |
|---|---|---|---|
| 2,841,301 | 7/1958 | Sherriff | 414/908 X |
| 2,986,866 | 6/1961 | Reichelt | 242/86.5 R |
| 3,737,050 | 6/1973 | Leeuwestein | 414/911 X |
| 3,786,948 | 1/1974 | Golden | 414/684 |
| 3,975,817 | 8/1976 | Frazier | 414/772 X |
| 4,023,639 | 5/1977 | Perhed | 414/754 X |

FOREIGN PATENT DOCUMENTS

| | | | |
|---|---|---|---|
| 888780 | 2/1962 | United Kingdom | 414/754 |

*Primary Examiner*—Galen L. Barefoot
*Assistant Examiner*—Terrance L. Siemens
*Attorney, Agent, or Firm*—R.J. Austin

[57] ABSTRACT

A coil handling device which orientates heavy coils between two positions, e.g. vertical and horizontal. The device is constructed to cause the center of gravity of the coil and a turning coil support to coincide with the axis of rotation. Hence, forces of resistance caused by weight are eliminated and only friction forces have to be overcome. Hence, a manual device is possible. In one arrangement, the device is adjustable to accommodate coils of different weights and sizes.

3 Claims, 8 Drawing Figures

COIL HANDLING DEVICE

This invention relates to coil handling devices.

In the handling of coils of material which may be in the form of electrical wire or cable, rope or strip materials, devices are used for changing the position of orientation of the major axis of the coils. Coils obviously may be of different weights but as the weight increases, handling difficulties also increase. Some cable coils, for instance, may have an outside diameter of 48 inches (1.22 meters) and weigh around 4,000 lbs. (1814 Kg). Present devices for changing the orientation position of such coils and larger make it extremely difficult to manipulate the coils because of the weight problems involved. Further, because of the weight, powered driving means is normally required for changing coil position. This results in a complex device which increases chances of breakdown and thus requires frequent maintenance from skilled persons in different fields, for instance in mechanical and electrical fields.

The present invention provides an assembly of coil and coil handling device which is of simple and easier operation and avoids the need for a powered drive to change the position of orientation of the coil.

Accordingly, the invention provides an assembly of coil and coil handling device comprising a coil support rotatable upon a carrying means about an axis of rotation to change the position of orientation of the major axis of the coil, the coil support comprising a support shaft for insertion axially within the coil, and the axis of rotation extending through the major axis of the shaft at a point substantially coincident with the resultant centre of gravity of the coil support and of the coil when mounted upon the shaft.

Because the centre of gravity of all the rotatable parts and coil coincide with the axis of rotation, it is necessary simply to overcome friction of the moving parts to effect the desired movement of the coil support and coil. Hence, it is found that there is an extremely small resistance to rotational movement and the coil support and coil may be easily rotated by a hand operated mechanism, thus avoiding use of a powered drive source.

Preferably, the coil support comprises a rotatable shaft lying with its major axis coincident with the axis of rotation, and an arm intermediate the rotatable shaft and the support shaft, the arm being inclined to the axis of rotation and drivably connecting the rotatable shaft to the support shaft. Such a construction is simple and enables the total weight to be reduced to a minimum thereby causing a reduction in frictional resistance to movement.

In a preferred arrangement, the support shaft is adjustable in position to permit coils of different weights to be carried alternatively upon the support while ensuring that the centre of gravity remains substantially coincident with the axis of rotation.

Hence, the invention also includes a coil handling device comprising a coil support having a part rotatable upon a carrying means about an axis of rotation and having a coil support shaft for insertion axially within a coil, the coil support shaft being disposed so that it has a major axis inclined to the axis of rotation and which is substantially coincident with the axis of rotation at a point along the axis of rotation, and the coil support also comprising a connecting means between the rotatable part and the support shaft, the connecting means allowing for adjustment of the position of the support shaft upon the rotatable part to dispose the centre of gravity of the coil support and coil when mounted upon the shaft, at a point in which it is substantially coincident with said axis of rotation.

Embodiments of the invention will now be described, by way of example, with reference to the accompanying drawings in which.

Figure 1:
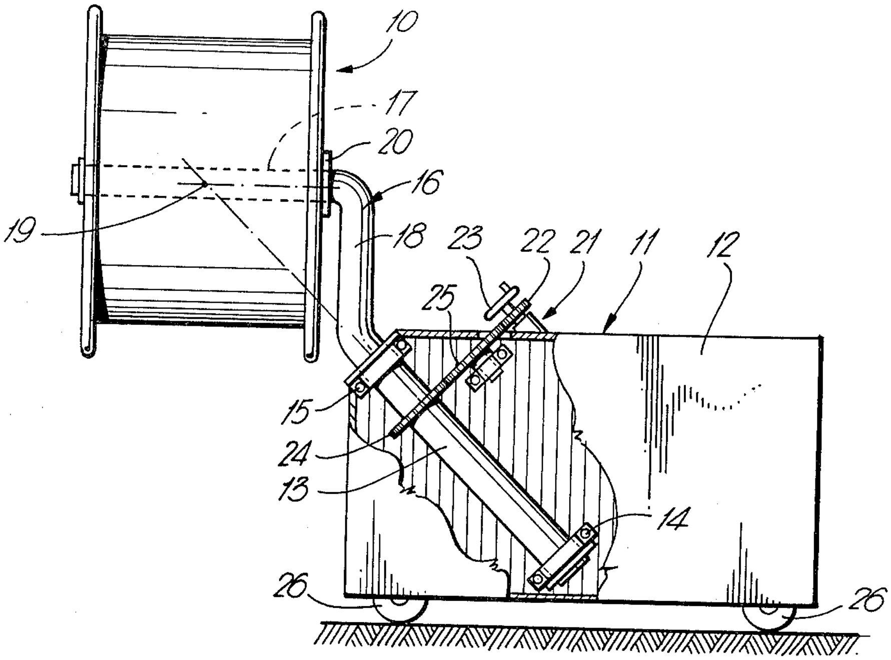
FIG. 1 is a side elevational view, partly in section of a coil and coil handling device assembly according to a first embodiment.
Figure 2:
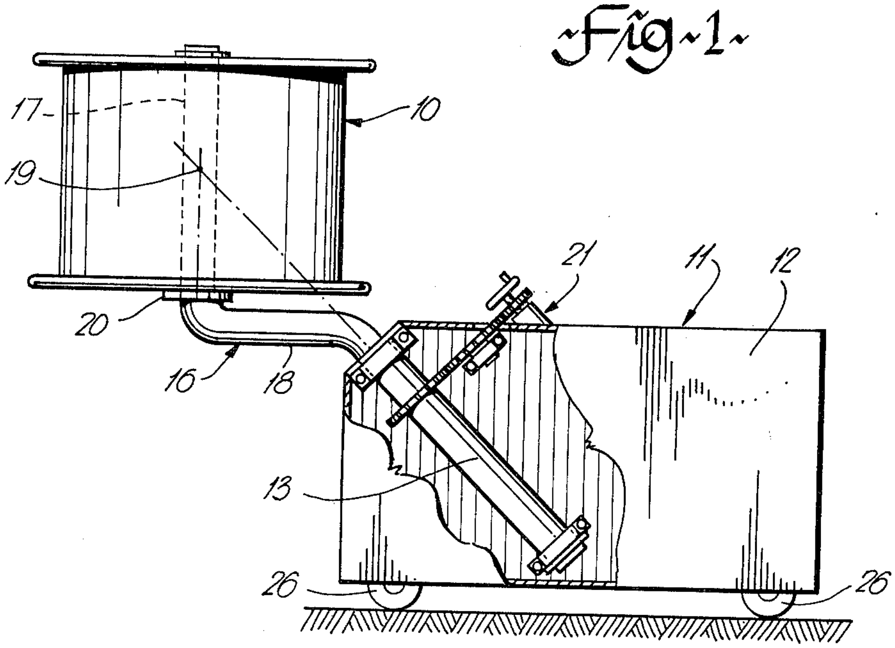
FIG. 2 is a view similar to FIG. 1 of the assembly showing the coil in a different position of orientation.

As shown in FIGS. 1 and 2, there is an assembly of coil 10 and coil handling device 11 according to the first embodiment. The coil is a 4000 lb., 48 inch diameter reel of copper wire. The device 11 comprises a carrying means which is a box frame 12, rotatably mounted within which is a shaft 13 within bearings 14, 15. The shaft 13 extends outwardly at an angle of 45° to the horizontal.

The shaft 13 forms part of a coil support 16 which is rotatable, by virtue of rotation of shaft 13, about an axis of rotation coincident with the major axis of the shaft. The support 16 also comprises a support shaft 17 for insertion axially within the coil 10, and a connecting means which is an arm 18 drivably interconnecting the coil and support shafts and inclined to the axis of rotation.

As shown, the two shafts and arm 18 are integrally formed to provide parts of a cranked shaft. The shaft 17 extends with its major axis at 45° to that of the rotatable shaft 13. Hence, in one position of rotation of the coil support 16, the shaft 17 extends horizontally with the arm vertical (FIG. 1). In a second position, the shaft 17 is vertical while the arm 18 is horizontal (FIG. 2).

The shafts 13, 17 and arm 18 lie in a common plane, i.e. the plane of FIGS. 1 and 2 when the shaft 17 is vertical or horizontal, so that the axis of rotation of shaft 13 coincides with the axis of shaft 17 at position 19. The coil support is also designed so as to hold the coil 10 upon the shaft 17 so that the resultant centre of gravity of the coil and coil support also coincides substantially with position 19. To this end, an abutment collar 20 is secured firmly to shaft 17 for engagement by the coil when this position for the centre of gravity is reached.

It will be appreciated that with a coil mounted upon the shaft 17 in either of the positions of FIGS. 1 and 2, it is a simple matter to rotate the coil support and coil into the other position because most resistance to movement is created by the friction of the moving parts.

The frictional forces, of course, are small compared with what would be created by the weight of the coil, but as the total weight is balanced at the axis of rotation, then it presents virtually no problem to turning of the coil.

It follows that a powered drive for rotating the coil may be avoided, and indeed, in the embodiment, a simple hand-operated drive 21 is used. As shown, the drive 21 comprises a driving gear 22, rotatable by handwheel 23 from outside the frame 12, driven gear 24 secured around shaft 13 and intermediate gear 25. The handwheel 23 is easily operated with one hand to rotate the coil between the positions of FIGS. 1 and 2. The ease of turning is such in practice that once the parts have commenced moving by use of the handwheel, it is found that movement continues by a person's hand pushing against the end of the arm 18 where it joins shaft 17.

As will be realized, the device 11 is used also to move coils 10 upon wheels 26 between different factory locations and it is an added advantage to avoid the weight of a power driving means, such as an electric motor, mounted upon the frame.

The above embodiment is useful for handling one size and weight of coil only if the centre of gravity is to lie at position 19. It is possible, however, to provide handling devices for handling different sizes and weights of coils while locating the resultant centre of gravities of the coil supports and the coils in a position substantially coincident with the axis of rotation. The second embodiment, now to be described, performs this function.

As shown in FIGS. 3 to 6 in the second embodiment, a handling device 30 comprises a box frame 12 and drive 21 to shaft 13 as shown in FIG. 1.

The shaft 13 is part of a coil support rotatable within the box frame 12.

A coil support 31 differs from support 16 in the first embodiment in that it is adjustable. The support 31 comprises a support shaft 32 which is sufficiently long to accomodate different length coils. The support shaft has one end fixed to an arm 33 which, with shaft 32 horizontal, extends vertically for a first part 34 and a second part 35 extends across the end of shaft 13 and normal to the rotational axis. The part 35 is machined to give it parallel side surfaces 36 (FIG. 5) by which the arm 33 is slidably received within a rectangular section guide 37, welded or otherwise secured to the outside of the frame 12. The arm 33 is adjustable within the guide by a rack and pinion arrangement, the pinion 38 being mounted on the outside of the guide and the rack 39 being formed upon a relieved surface portion of the part 35 of the arm. A handwheel (not shown) is used to operate the rack and pinion.

Figure 3:
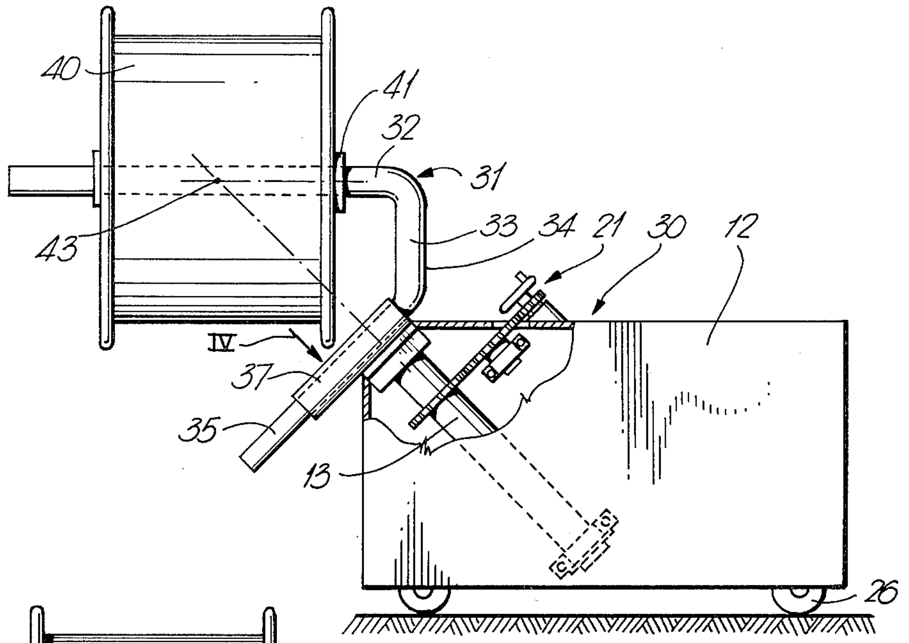
FIG. 3 is a view similar to FIG. 1 of a second embodiment.

As shown by FIG. 3, with the shaft 32 carrying the lightest coil 40 against an abutment collar 41, the arm is moved radially of the rotational axis through the guide until the resultant centre of gravity of the coil and the coil support (i.e. the shafts 13 and 32 and arm 33) is coincident with the rotational axis at position 41. The coil may then be rotated easily into a vertical position, for instance as shown for the first embodiment in FIG. 2.

Figure 6:
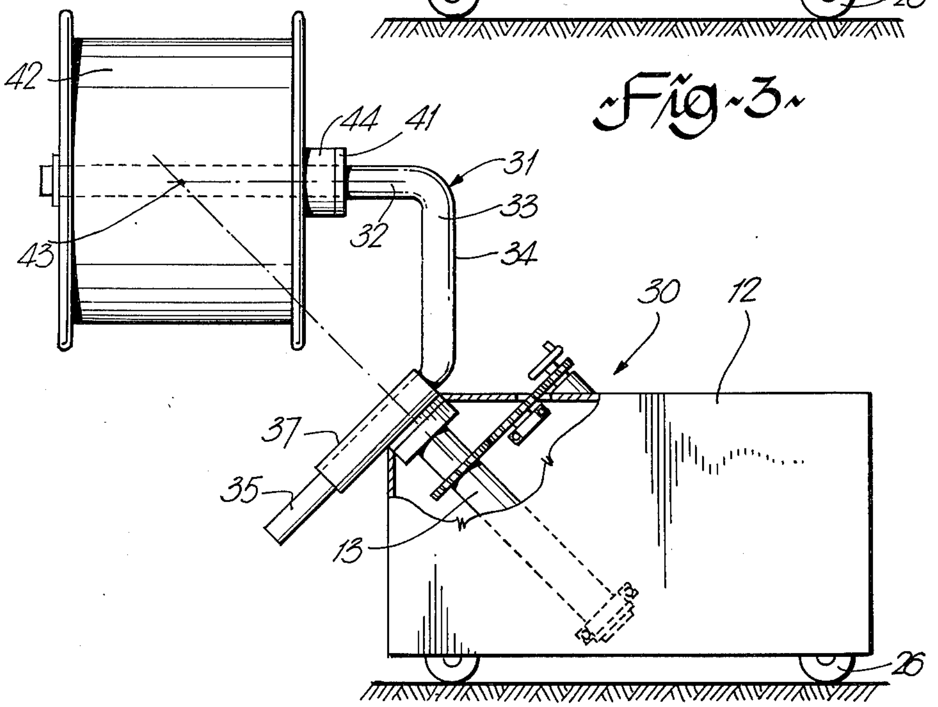
FIG. 6 is a view similar to FIG. 3 of the device of the second embodiment after adjustment.
Figure 4:
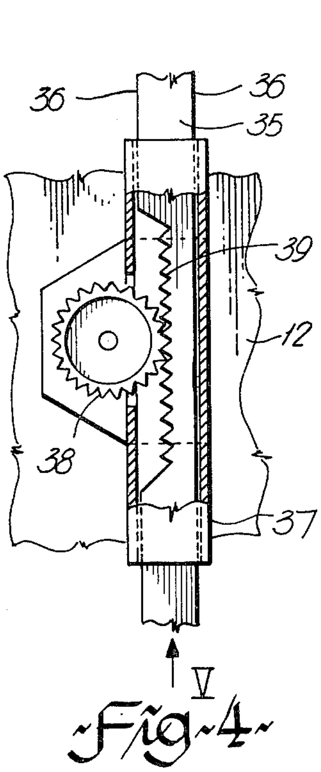
FIG. 4 is a view taken in the direction of arrow IV in FIG. 3 and on a larger scale.

If it is required to mount a coil 42 of different size and weight upon the shaft 32, then it is simply necessary to move the arm 33 through the guide by means of the rack and pinion until the resultant centre of gravity lies at position 43 coincident with the rotational axis, before turning the coil into a vertical position. This is illustrated by FIG. 6 which, when compared with FIG. 3, shows the displacement of the arm 33. To hold larger diameter coils away from the guide 37, it may be necessary to locate a spacing tube 44 between coil and collar 41. Alternatively, the collar itself may be provided with a removable holding means (not shown) such as a location pin which is locatable within any of a number of spaced holes along shaft 32 to allow for collar movement along the shaft.

Figure 7:
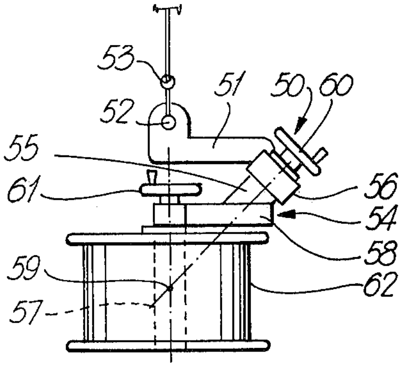
FIGS. 7 and 8 are two side elevational views of a third embodiment showing a device in different positions.
Figure 5:
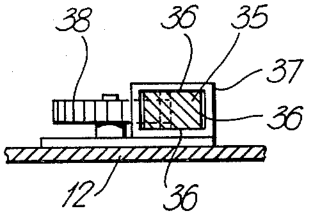
FIG. 5 is a view taken in the direction of arrow V in FIG. 4.
Figure 8:
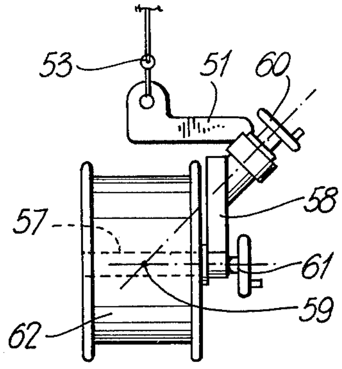

In a third embodiment shown in FIGS. 7 and 8, a coil handling device 50 is shown for raising coils of bare copper and for moving them downwardly into an annealing furnace. As shown, the device comprises a carrying means which is an arm 51 formed at one end with a hole 52 for acceptance of a hoist hook 53. At its other end the arm carries a coil support 54. The support 54 comprises a shaft 55 rotatably inclined at 45° to the longitudinal direction of the arm, within a tube mounting 56 secured to the arm. The coil support also includes a coil support shaft 57 extending from one end of an arm 58 secured to both the shafts 55 and 57. The shafts 55 and 57 and arm 58 lie in one plane, i.e. the planes of FIGS. 7 and 8 so that the axis of rotation of the shaft 55 and thus the coil support is coincident with the major axis of the shaft 57 at position 59. Handwheel 60 is provided at the end of the shaft 55 to rotate the shaft. The handwheel may be mounted directly upon the end of the shaft or reduction gearing (not shown) may be provided between handwheel and shaft.

The shaft 57 is of radially expansible and contractible construction which is conventional for use with devices for lifting coils. To allow for expansion and contraction, handwheel 61 is provided.

What is claimed is:

1. A coil handling device comprising a coil support having a part rotatable upon a carrying means about an axis of rotation and having a coil support shaft for insertion axially within a coil, the coil support shaft being disposed so that the shaft axis is inclined to the axis of rotation and is substantially coincident with the axis of rotation at a point along the axis of rotation from the carrying means, and the coil support also comprising a connecting means between the rotatable part and the support shaft, and the support shaft being adjustable in position relative to the rotatable part upon the connecting means to dispose the resultant centre of gravity of the coil support and coil when mounted upon the shaft, at a point in which it is substantially coincident with said axis of rotation.

2. A device according to claim 1 wherein the connecting means comprises an arm interconnected with the support shaft, the arm extending across the rotatable part and received within guide means, for movement along the guide means to adjust the position of the arm and the support relative to the rotatable part, and position adjusting means for the arm along the guide means.

3. A device according to claim 2 wherein the adjusting means comprises a rack and pinion, the rack being formed upon the arm and the pinion mounted on the outside of the guide and in engagement with the rack.

* * * * *